United States Patent [19]
Grissom

[11] Patent Number: 5,165,636
[45] Date of Patent: Nov. 24, 1992

[54] STABILIZING SUPPORT TERMINUS

[76] Inventor: Michael D. Grissom, 5416 Amsterdam Pl., Raleigh, N.C. 27606

[21] Appl. No.: 761,310

[22] Filed: Sep. 17, 1991

[51] Int. Cl.⁵ .......................................... F16M 11/24
[52] U.S. Cl. ................................. 248/188.3; 248/615
[58] Field of Search ............... 248/188.2, 188.3, 188.4, 248/188.9, 615, 621, 631

[56] References Cited

U.S. PATENT DOCUMENTS

| | | | |
|---|---|---|---|
| 2,704,663 | 3/1955 | Blake | 248/188.2 X |
| 2,836,843 | 6/1958 | Gallagher, Jr. | 248/118.3 X |
| 2,871,616 | 2/1959 | Sundell | 248/118.3 |
| 2,944,367 | 7/1960 | Bontecue | 248/615 X |
| 2,963,256 | 12/1960 | Borah | 248/615 X |
| 3,144,234 | 8/1964 | Artmann | 248/188.2 |
| 3,388,883 | 6/1968 | Axthammer et al. | 248/188.2 |
| 3,927,853 | 12/1975 | Guth | 248/188.2 |
| 5,042,764 | 8/1991 | Carpinella et al. | 248/188.2 |
| 5,042,765 | 8/1991 | Widerstrom | 248/188.3 |

Primary Examiner—Ramon O. Ramirez

[57] ABSTRACT

This invention is a stabilizing terminus which includes a bulbous portion formed from a pliable, high viscous material encapsulated in a durable yet pliable vinyl coating having a shape retaining memory. When pressure is placed on the bulbous portion, it will slowly change shape to meet the contour requirements of the surface on which it rests. By using this terminus on a plurality of supports such as chairs legs, refrigerators, table legs and the like, these supports become stabilized.

14 Claims, 3 Drawing Sheets

STABILIZING SUPPORT TERMINUS

FIELD OF INVENTION

This invention relates to support means and more particularly to stabilizing terminuses.

BACKGROUND OF INVENTION

Over the years when four or more legs or other support members have been used, problems have arisen unless the terminus end of all such members lie in the same plane and the surface on which they rest is flat.

On the other hand, if any one of the support members does not lie in a plane with the remaining support members or, if the terminus ends lie in the same plane but the support surface is uneven, then a rocking motion can occur. The more out of plane or the more uneven the surface, the more exaggerated the rocking motion can become when weight is shifted on the article being supported.

To overcome the above mentioned problems, springs have been used on the terminus portion of the supports as well as pliable rubber and similar resilient means to compensate for unevenness.

The problem with these prior known supports is that the compressed terminus or terminuses have bias pressure to return to their original position when weight is shifted on the article being supported, this can actually amplify the rocking motion rather then preventing it.

Spring dampening means have been tried utilizing viscous material such as bounce putty to dampen spring motion of support terminuses. The hard outer casing, however, would not conform to support surface irregularities and if the casing were soft, the piston therein would not work.

The age old solution to the rocking problem are support feet with threaded shafts that can be longitudinally adjusted up or down to compensate for uneven surfaces. First, this requires the laborious job of getting adjacent to the support surface such as the floor to screw the support feet in or out of the support structure such as chair legs, etc. Also, when the supported structure is moved to a different location or is turned to a different orientation, further adjusting of the support feet may be required to again obtain equal pressure on all legs to prevent rocking.

BRIEF DESCRIPTION OF INVENTION

After much research and study into the above mentioned problems, the present invention has been developed to provide a stabilizing support terminus which compensates for unevenness in either the support surface or the support means. This is accomplished through the provision of a high viscous fluid encapsulated in a pressure deformable covering having a memory so that when the pressure is removed, the terminus will return to its original shape or configuration. In otherwords, when an uneven surface is encountered, each terminus will slowly deform by the flow of the highly viscous fluid within the pressure deformable cover until equilibrium is reached. Any shifts in the center of gravity of the article being supported may cause additional deforming or reforming of different terminuses, but the movement will be so slow that the no rocking sensation will be encountered.

The pressure deformable covering and reformable memory therein give great versatility to the present invention in a myriad of different applications.

DISCUSSION OF PRIOR ART

U.S. Pat. No. 1,961,839 to Bales is typical of the use of rubber foot portions for furniture and the like. Rubber under pressure will, of course, deform and compress with a reform memory but the greater the pressure on the rubber, the more biased it is to return to its original position. This, of course, gives a resilient or springy foot terminus that can even create a bounce when, for example, a person sits down hard on a chair or stool.

U.S. patent class 248, subclass 615 includes many patents utilizing springs as foot supports or teminuses for devices such as typewriters and the like. Each of these spring devices, of course, encounters the same problems of rubber terminuses in that the more they are compressed, the stronger the biasing force is in the opposite direction. This can actually exaggerate the rocking rather than dampening the same.

U.S. Pat. No. 2,704,663 to Blake used a slightly different twist to the idea of a spring loaded foot by enclosing the spring in a dashpot with a piston that is dampened by bouncing putty. This putty has characteristics somewhat similar to the present invention's high viscous fluid material but the piston would not work if the dashpot was made of pliable material. This patent disclosure also has limited compensating movement and does not take in to account different angles of disposition when in use on different articles being supported.

OBJECTS OF INVENTION

In view of the above, it is an object of the present invention to provide a stabilizing support terminus that utilizes a high viscous fluid encapsulated in a pressure deformable covering having a memory configuration.

Another object of the present invention is to provide a stabilizing support terminus having a high viscous fluid encapsulated in a pressure deformable covering having a memory that is so shaped as to be usably operable from vertical to angles exceeding 45 degrees from vertical.

Another object of the invention is to provide a stabilizing support terminus that is simple in construction, appealing to the eye and functionally stable.

Another object of the present invention is to provide a stabilizing support terminus including a high viscous fluid of the silicon type encapsulated in a pressure deformable plastisol covering having a shape memory.

Another object of the present invention is to provide a stabilizing support terminus having a high viscous fluid encapsulated in a pressure deformable covering having a memory with a coating of wear resistant material on the bottom thereof.

Other objects and advantages of the present invention will become apparent and obvious from a study of the following description and the accompanying drawings which are merely illustrated of such invention.

DETAILED DESCRIPTION OF INVENTION

With further reference to the drawings, the stabilizing support terminus of the present invention, indicated generally at 10, includes an attaching shaft 11, a bulbous support portion 12, and a shoulder portion 13 that makes the transition between the shaft and the bulbous portion.

Figure 1:
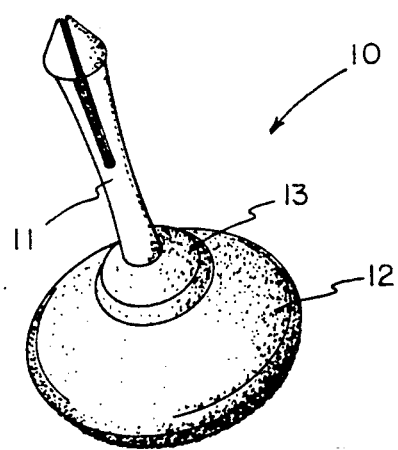
FIG. 1 is a top elevational view of one version of the stabilizing support terminus of the present invention.
Figure 3:
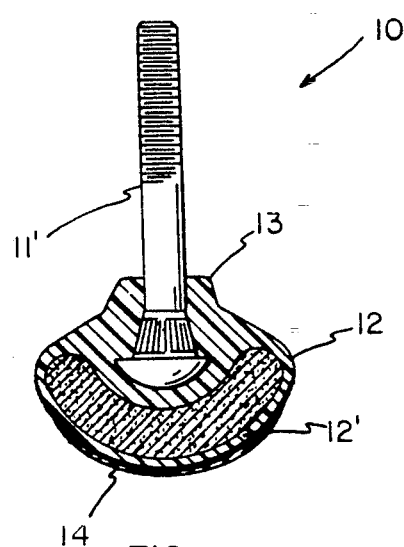
FIG. 3 is a sectional view of a modification thereof.
Figure 2:
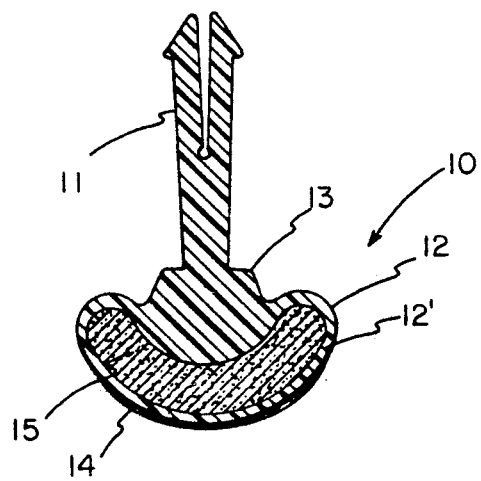
FIG. 2 is a sectional view thereof showing the high viscous fluid encapsulated within the pressure deformable cover in relaxed memory position.
Figure 4:
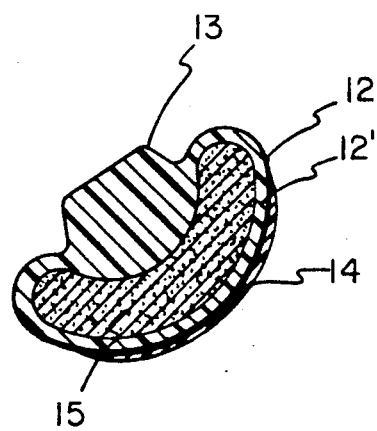
FIG. 4 is a fragmentary view of a section of the present invention disposed at an angle and resting on a support surface.

The shaft 11 can either be integrally formed with shoulder portion 13 and bulbous portion 12 as seen in FIG. 2, or such shaft can be a separate member such as the furniture bolt 11' shown in FIG. 3.

If furniture bolts 11' are used in the manufacture of the stabilizing terminus of the present invention, they should be coated with a metal primer to ensure that the plastisol the shoulder and bulbous portion are formed from will adhere to such bolts A suitable primer for this purpose is #RA-175 manufactured by the Dexter Corporation, Dexter Plastisol Division located in Pineville, N.C.

A flexible, highly scuff resistant coating 14 is provided on the bottom half of the bulbous portion 12 of the present invention.

The shoulder and bulbous portions of the present invention are formed from a high elongation plastisol with memory characteristics that return the bulbous portion to it's original shape after use. A suitable plastisol for this purpose is #RDP-1715X73191 also manufactured by the Dexter Corporation.

The highly scuff resistant material that coats the bottom half of bulbous portion 12 is a high shore plastisol such as #RDP-1821-1J from the Dexter Corporation.

The high viscous fluid 15 is a silicon based, high viscous compound such as Dow Corning #244758 and #244768 produced by Dow Corning STI, located in Monroe, Conn.

Figure 5:
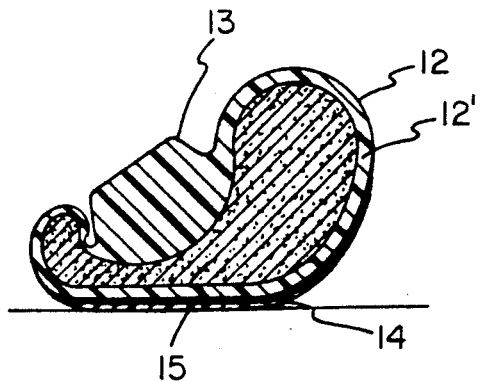
FIG. 5 is a fragmentary view of a section of the present invention at an angle and being pressure deformed.
Figure 6:
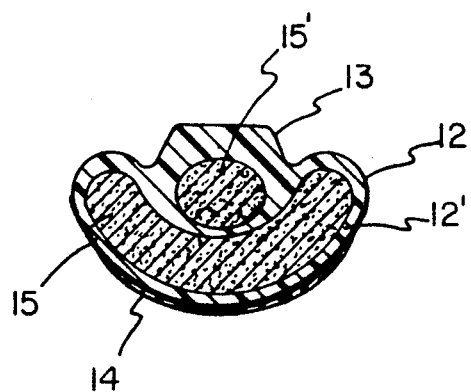
FIG. 6 is a fragmentary view of a section of a modification to the present invention having two high viscous fluid material chambers encapsulated within a pressure deformable cover having a memory.

Although the preferred embodiment of the present invention includes a single pocket of high viscous fluid 15 encapsulated in the bulbous portion 12 formed from high elongated plastisol, a second fluid chamber 15' can be provided as shown clearly in FIG. 6. This version of the present invention will somewhat limit the compression distortion which occurs when the present invention is in use as illustrated in FIG. 5.

Figure 7:
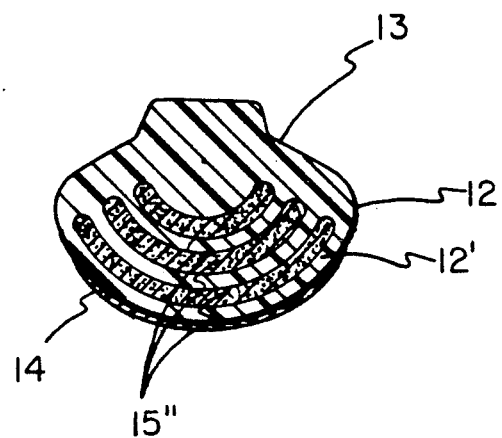
FIG. 7 is a fragmentary view of the section of still another modification of the present invention showing a plurality of high viscous fluid chambers within the pressure deformable covering having a memory.
Figure 8:
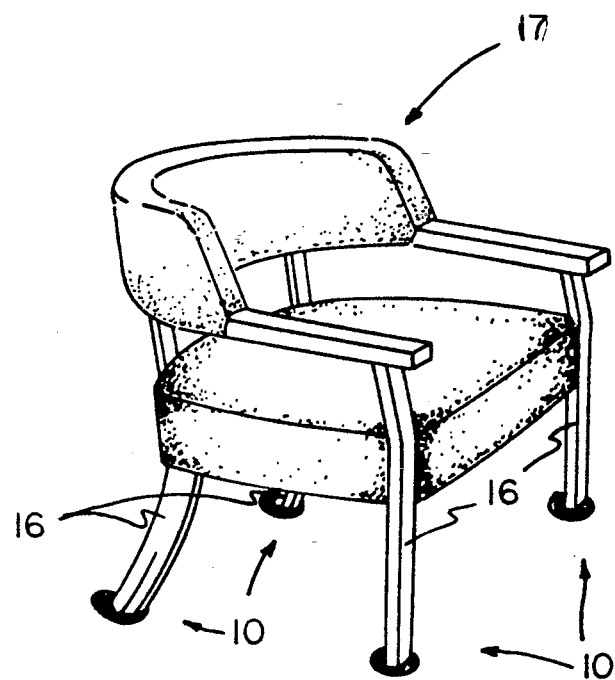
FIG. 8 is a side elevational view of a typical multi-leg article in use with two of the stabilizing terminuses of the present invention being disclosed angularly and two of the same being disclosed vertically.

The version of the present invention shown in FIG. 7 contains a plurality of fluid chambers 15" which further limits compression distortion while at the same time retaining the stabilizing characteristics of such invention.

Although there are a number of ways of producing the stabilizing support terminus 10 of the present invention, hot dip coating is one of the preferred methods.

Even though attaching shaft 11 is shown and described in conjunction with the present invention, other suitable attaching means can, or course, be substituted for the same.

To use the stabilizing support terminuses of the present invention, the same is attached by inserting the shaft portion 11 into the leg or other support means 16 of the article being supported, as indicated generally at 17. If ends of the legs 16 do not all lie in the same plane, or if the support surface 18 is uneven, the bulbous portion of the different terminuses will deform in differing amounts as the high viscous fluid 15 within the plastisol covering 12' slowly changes shape.

If there is a shift in the center of gravity of the article 17, some additional deforming flow may occur in the different terminuses, but due to the slow movement of the high viscous fluid 15, no sensation of rocking will occur.

When the deforming pressure is removed from the various terminuses 10 of the present invention, they will slowly return to their original bulbous shape as illustrated in FIGS. 1 through 4, 6 and 7.

The terms "upper", "lower", "bottom" and so forth have been used herein merely for convenience to describe the present invention and it's parts as oriented in the drawings. It is to be understood, however, that these terms are in no way limiting the invention since such invention may obviously be disposed in different orientations when in use.

The present invention may, of course, be carried out in other specific ways that those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A stabilizing support terminus comprising: a high viscous fluid material formed from silicon based compound encapsulated in a pressure deformable covering having a reformable memory; a coating of high scuff resistant material covering at least the lower portion of said pressure deformable covering; and means for attaching said stabilizing support to an article to be supported whereby when a plurality of said supports are attached to the said article to be supported, said fluid will slowly deform the covering of each of the terminus until equilibrium therebetween is reached.

2. The stabilizing support of claim 1 wherein at least three pockets of high viscous fluid material are encapsulated in said pressure deformable covering.

3. The stabilizing support of claim 1 wherein said high scuff resistant material is a high shore plastisol.

4. The stabilizing support of claim 1 wherein said pressure deformable covering is a high elongation plastisol.

5. The stabilizing support of claim 1 wherein a plurality of pockets of high viscous fluid material are encapsulated in said pressure deformable covering.

6. The stabilizing support of claim 1 wherein the means for attaching said support to said article is an integrally formed shaft.

7. The stabilizing support of claim 1 wherein the means for attaching said support to said article is a bolt-like member with one end embedded in the upper portion of said pressure deformable covering.

8. The stabilizing support of claim 1 wherein at least two pockets of high viscous fluid material are encapsulated in said pressure deformable covering.

9. A stabilizing support terminus comprising: a high viscous fluid silicon compound encapsulated in a pressure deformable covering of high elongation plastisol having a reformable memory; a scuff resistant coating covering at least a portion of said deformable covering formed from a high shore plastisol; and means for attaching the stabilizing support to an article to be supported whereby when a plurality of said supports are attached to the said article to be supported, said fluid will slowly deform the covering of each of the terminus until equilibrium therebetween is reached.

10. The stabilizing support of claim 9 wherein at least three pockets of high viscous fluid material are encapsulated in said pressure deformable covering.

11. The stabilizing support of claim 9 wherein a plurality of pockets of high viscous fluid material are encapsulated in said pressure deformable covering.

12. The stabilizing support of claim 9 wherein said attaching is an integrally formed shaft.

13. The stabilizing support of claim 9 wherein said attaching means is a bolt like member with one end embedded in the upper portion of the said pressure deformable covering.

14. The stabilizing support of claim 9 wherein at least two pockets of high viscous fluid material are encapsulated in said pressure deformable covering.

* * * * *